UNITED STATES PATENT OFFICE.

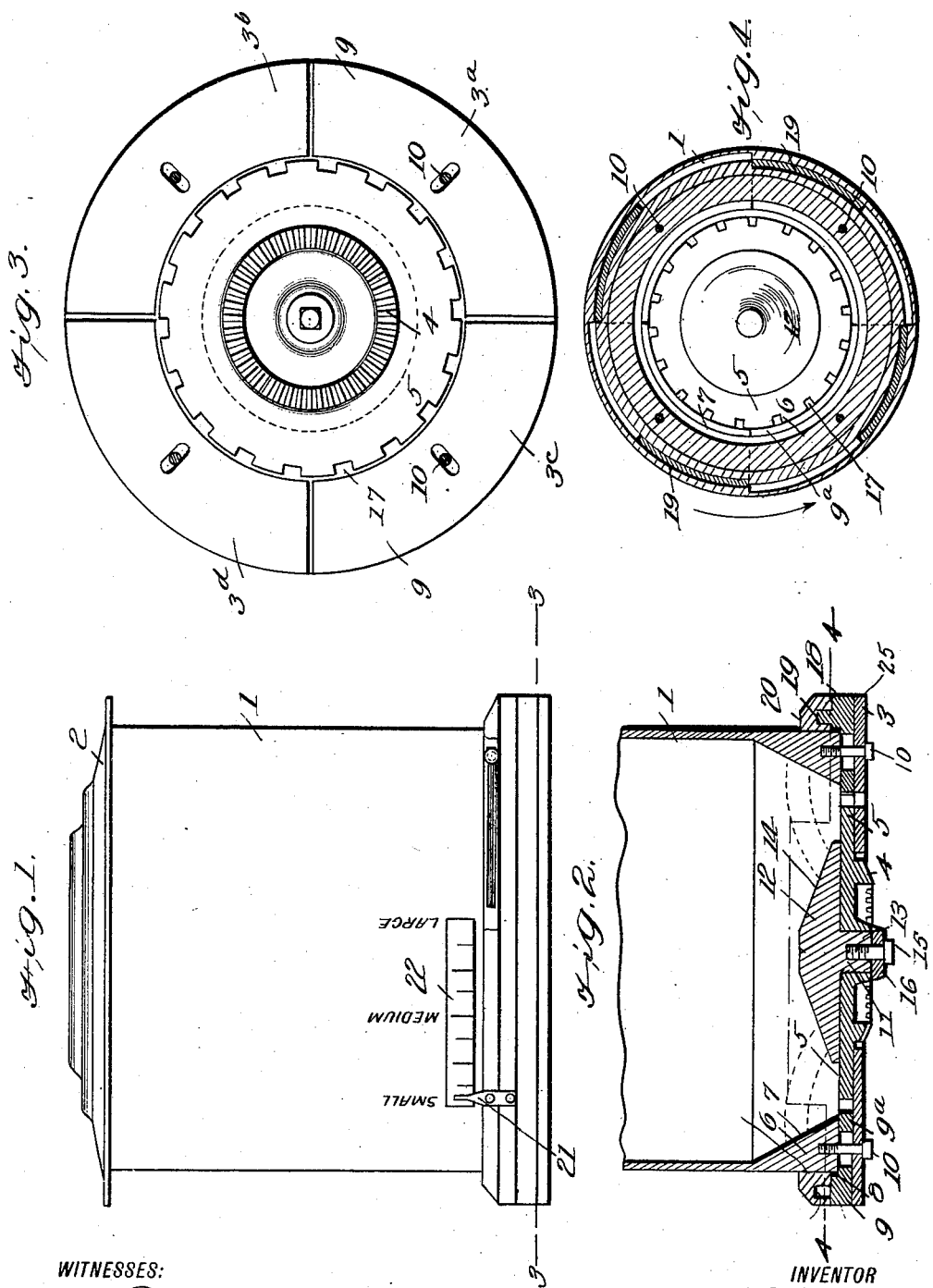

ALONZO M. CRISMAN, OF DAVENPORT, IOWA.

ADJUSTABLE SEED-CELL FOR PLANTERS.

991,279.  Specification of Letters Patent.  Patented May 2, 1911.

Application filed May 19, 1910. Serial No. 562,115.

*To all whom it may concern:*

Be it known that I, ALONZO M. CRISMAN, a citizen of the United States, and a resident of Davenport, in the county of Scott and State of Iowa, have made certain new and useful Improvements in Adjustable Seed-Cells for Planters, of which the following is a specification.

My invention is an improvement in adjustable seed cells for planters, and consists in certain novel constructions and combinations of parts, hereinafter described and claimed.

The object of the invention is to provide a plate of the character specified, having means for adjusting the size of the seed cell, wherein it will not be necessary to change the seed plates for seeds of different sizes.

Referring to the drawings forming a part hereof, Figure 1 is a side view of the improvement, Fig. 2 is a partial vertical section of the improvement, Fig. 3 is a section on the line 3—3 of Fig. 1, and Fig. 4 is a section on the line 4—4 of Fig. 2.

The embodiment of the invention shown comprises a container, composed of a cylindrical shell 1, having a cover 2, and seated on a base composed of a ring 3 to be described, having a central opening, through which extends an annular series of bevel gear teeth 4 on the seed plate 5. The lower edge of the shell is thickened to form a ledge as shown at 6, and the inner face thereof is inclined inwardly and downwardly as shown at 7 to form a hopper bottom, and the outer edge of the said bottom rests on a shoulder 8 on an annular spacing plate, which is seated on the ring 3.

Cap screws 10 pass through radial slots in the ring 3, and engage the bottom face of the enlargement to secure the parts together, and the said ring 3 is formed in four segmental sections 3ª, 3ᵇ, 3ᶜ, 3ᵈ the sections being spaced apart at their ends, and being movable radially toward and from the seed plate. The seed plate is provided with a hub 11, and a deflector 12 of disk form is provided with a central depending lug 13, which extends into the hub of the seed plate. The upper face of the deflector is beveled from its center to its periphery as shown at 14, so that the seed in the container is deflected onto the seed plate, near its periphery. A cap screw 15 extends through a washer 16 into engagement with the lug 13 of the deflector, to hold the said deflector in place, and the seed plate is provided in its edge at spaced intervals with recesses 17, forming cells for receiving the seed.

As shown more especially in Fig. 2, each section of the ring 3 is provided with a flange 18 at its margin, forming the shoulder 8 before mentioned, and on the upper face of each flange is a rib or thread 19, arranged eccentrically, with respect to the section, and forming a species of cam or screw thread. A ring 20 encircles the container above the flange 18, and the said ring is provided on its lower face with a groove arranged eccentrically, and into which the ribs or threads fit, the said ribs being of lesser length than the grooves. The ring 20 is rotatable, and it will be evident that when it is turned with respect to the container, the sections of the ring 3 will be moved radially. The inner edges of the section thus may be moved toward and from the periphery of the seed plate, to vary the capacity of the cells, in accordance with the grain to be planted. A pointer or indicator 21 is secured to the ring 20, and coöperates with a scale 22 on the container to indicate the capacity of the cells.

The sections of the ring 3, and the seed plate are held in place by a ring 25, arranged below the said elements and upon which the sections of the ring move. The inner edge of the ring 25 is spaced apart slightly from the beveled gear teeth, as shown, and the said ring is held in place by the cap screws 10. The ring is also provided at suitable intervals with openings through which the seeds from the cells are dropped. The above described is the usual construction of planters and it is not thought necessary to further describe the same.

I claim—

1. In a planter, a seed container having an open bottom, a seed plate in the bottom of the container and concentric therewith, said plate having a plurality of spaced notches in its periphery, forming cells for the seeds, a ring comprising a plurality of segmental sections encircling the seed plate and extending beyond the periphery of the container, each section having a radial slot, and an eccentric rib, the ribs having the same pitch and direction on all of the sections, the bottom of the container being reduced inwardly to form a ledge and having the inner wall of the ledge inclined inwardly and downwardly, a deflector disk on the seed plate said disk having its upper surface beveled from its center toward its periphery, a ring below the sectional ring, cap screws passing through the ring and the slots of the sections and engaging the enlargement, a ring encircling the container and resting on the outer edges of the sections of the ring, and having eccentric grooves for engagement by the ribs, a pointer on the ring, and a scale on the container for coöperating therewith.

2. In a planter, a seed container having an open bottom, a seed plate in the bottom of the container and concentric therewith, said plate having a plurality of spaced notches in its periphery, forming cells for the seeds, a ring comprising a plurality of segmental sections encircling the seed plate and extending beyond the periphery of the container, each section having a radial slot, and an eccentric rib, the ribs having the same pitch and direction on all of the sections, the bottom of the container being reduced inwardly to form a ledge and having the inner wall of the ledge inclined inwardly and downwardly, a deflector disk on the seed plate said disk having its upper surface beveled from its center toward its periphery, a ring below the sectional ring, cap screws passing through the ring and the slots of the sections and engaging the enlargement, a ring encircling the container and resting on the outer edges of the sections of the ring, and having eccentric grooves for engagement by the ribs.

3. In a planter, a seed container having an open bottom, a seed plate in the bottom of the container and concentric therewith, said plate having a plurality of spaced notches in its periphery, forming cells for the seeds, a ring comprising a plurality of segmental sections encircling the seed plate and extending beyond the periphery of the container, each section having a radial slot and an eccentric rib, the ribs having the same pitch and direction as all of the sections, a ring encircling the container and resting on the outer edges of the sectional ring, and having eccentric grooves for engagement by the ribs, an indicator on the ring, and a scale on the container for coöperating therewith.

4. In a planter, a seed container having an open bottom, a seed plate in the bottom of the container and concentric therewith, said plate having a plurality of spaced notches in its periphery, forming cells for the seeds, a ring comprising a plurality of segmental sections encircling the seed plate and extending beyond the periphery of the container, each section having a radial slot and an eccentric rib, the ribs having the same pitch and direction as all of the sections, and a ring encircling the container and resting on the outer edges of the sectional ring.

5. In a planter, a seed container having an open bottom, a seed plate in the bottom of the container and concentric therewith, said plate having a plurality of spaced notches in its periphery, forming cells for the seeds, a sectional ring encircling the seed plate, the ends of the sections being spaced apart, the edges extending beyond the periphery of the container, said ring having eccentric ribs on the extended edges, the ribs having the same pitch and direction on all of the sections, and a ring encircling the container and having grooves eccentrically arranged for engagement by the ribs, a pointer on the ring, and a scale on the container.

6. In a planter, a seed container having an open bottom, a seed plate in the bottom of the container and concentric therewith, said plate having a plurality of spaced notches in its periphery, forming cells for the seeds, a sectional ring encircling the seed plate, the end of the sections being spaced apart, the edges extending beyond the periphery of the container, said ring having eccentric ribs on the extended edges, the ribs having the same pitch and direction on all of the sections, and a ring encircling the container and having grooves eccentrically arranged for engagement by the ribs.

7. In a planter, a seed container, a seed plate rotatable in the container and having in its peripheral edge a plurality of notches forming seed cells, a segmental ring encircling the plate, each of the segments having an eccentric rib on its upper face, a ring rotatable on the container, and having eccentric grooves engaged by the ribs, an indicator on the ring, and a scale on the container with which the indicator coöperates.

8. In a planter, a seed container, a seed plate rotatable in the container and having in its peripheral edge a plurality of notches forming seed cells, a segmental ring encircling the plate, each of the segments having an eccentric rib on its upper face and, a ring rotatable on the container, and having eccentric grooves engaged by the ribs.

9. In a planter, a seed container, a seed plate rotatable in the container and having in its peripheral edge a plurality of notches forming seed cells, a segmental ring encircling the plate, means for simultaneously moving said sections toward and from the edge of the seed plate, and means for indicating the extent of movement of the sections.

10. In a planter, a seed container, a seed plate rotatable in the container and having in its peripheral edge a plurality of notches forming seed cells, a segmental ring encircling the plate, and means for simultaneously moving the sections toward and from the seed plate.

11. In a planter, a seed container, a seed plate in the container having in its peripheral edge a plurality of notches, and a segmental ring encircling the plate, the sections being movable toward and from the plate.

ALONZO M. CRISMAN.

Witnesses:
JOSEPH J. BRUS,
THOMAS SIEVERS.

Copies of this patent may be obtained for five cents each, by addressing the "Commissioner of Patents, Washington, D. C."